(12) United States Patent
Wang et al.

(10) Patent No.: US 9,274,961 B2
(45) Date of Patent: Mar. 1, 2016

(54) METHOD FOR BUILDING MULTI-PROCESSOR SYSTEM WITH NODES HAVING MULTIPLE CACHE COHERENCY DOMAINS

(71) Applicant: INSPUR ELECTRONIC INFORMATION INDUSTRY CO., LTD, Jinan (CN)

(72) Inventors: Endong Wang, Jinan (CN); Leijun Hu, Jinan (CN); Jicheng Chen, Jinan (CN); Dong Zhang, Jinan (CN); Weifeng Gong, Jinan (CN); Feng Zhang, Jinan (CN)

(73) Assignee: INSPUR ELECTRONIC INFORMATION INDUSTRY CO., LTD, Jinan (CN)

( * ) Notice: Subject to any disclaimer, the term of this patent is extended or adjusted under 35 U.S.C. 154(b) by 0 days.

(21) Appl. No.: 14/534,842

(22) Filed: Nov. 6, 2014

(65) Prior Publication Data
US 2015/0067269 A1    Mar. 5, 2015

Related U.S. Application Data

(63) Continuation of application No. PCT/CN2013/070807, filed on Jan. 22, 2013.

(30) Foreign Application Priority Data

Dec. 17, 2012    (CN) .......................... 2012 1 0544976

(51) Int. Cl.
*G06F 12/08*    (2006.01)
*G06F 15/173*    (2006.01)

(52) U.S. Cl.
CPC .......... *G06F 12/0822* (2013.01); *G06F 12/082* (2013.01); *G06F 15/17368* (2013.01); *G06F 2212/2542* (2013.01); *G06F 2212/622* (2013.01)

(58) Field of Classification Search
None
See application file for complete search history.

(56) References Cited

U.S. PATENT DOCUMENTS

2009/0248983 A1 * 10/2009 Offen .................. G06F 12/0822
711/122

FOREIGN PATENT DOCUMENTS

| CN | 101978359 | 2/2011 |
|---|---|---|
| CN | 102270180 | 12/2011 |
| CN | 102804151 | 11/2012 |

* cited by examiner

*Primary Examiner* — Jared Rutz
*Assistant Examiner* — Christopher Do
(74) *Attorney, Agent, or Firm* — Hamre, Schumann, Mueller & Larson, P.C.

(57) ABSTRACT

A method for building a multi-processor system with nodes having multiple cache coherency domains. In this system, a directory built in a node controller needs to include processor domain attribute information, and the information can be acquired by configuring cache coherency domain attributes of ports of the node controller connected to processors. In the disclosure herein, the node controller can support the multiple physical cache coherency domains in a node.

1 Claim, 8 Drawing Sheets

METHOD FOR BUILDING MULTI-PROCESSOR SYSTEM WITH NODES HAVING MULTIPLE CACHE COHERENCY DOMAINS

TECHNICAL FIELD

The disclosure herein relates to the field of computer applications, and in particular, to a method for building a multi-processor system with nodes having multiple cache coherency domains.

BACKGROUND

For a multi-processor system, multiple processors share the memory space in the system. Currently, a connection manner of multiple processors is changed from bus connection to point-to-point connection, and a memory is also directly hooked to the processor instead of being hooked to an external bridge chip of the processor. Because of the change of memory hooking manner, distribution of the memory in the system is also changed, thereby causing non-uniformity of memory access in the multi-processor system, and therefore, current multi-processor systems are mostly Non-Uniform Memory Access (NUMA) architecture systems.

The NUMA architecture multi-processor system has the following 3 important characteristics:

1. all memories are addressed uniformly, so as to form a unified memory space;
2. all processors can access all addresses in the memory space;
3. accessing a remote memory is slower than accessing a local memory.

The NUMA system has multiple cache units distributed in the system, and therefore, the NUMA system shall be designed to solve the problem of coherence between multiple caches. A NUMA system satisfying cache coherence is also referred to as a Cache Coherent Non-Uniform Memory Access (CC-NUMA) system. How to solve the problem of cache coherence is a core problem of the CC-NUMA system.

Currently, the processor is directly hooked to the memory, and the processor supports a cache coherence protocol; therefore, in one solution, the processors are directly interconnected to form a multi-processor system, and cache coherence between the processors may be guaranteed by cache coherence protocol maintenance engines of the processors, so as to form a single cache coherency domain. In the single cache coherency domain, various processors are identified and recognized by using processor ID numbers. However, a multi-processor system organized in this manner has a limited scale, because every processor occupies at least one processor ID number in the cache coherency domain, and the number of processor ID numbers that can be distinguished by every processor is limited. For example, a processor can distinguish 4 processor ID numbers, that is, the processor can support direct interconnection of at most 4 processors in the domain. For another example, a processor can only distinguish 2 processor IDs, and can only support two processors in a cache coherency domain. Moreover, due to physical limits and price limits, the number of interconnection ports of processors are also limited, in some circumstances, although the number of processor IDs supported by the processor in the single cache coherency domain can meet the requirement, the direct connection causes large hop counts and delay for cross-processor memory access, and therefore, a high-efficient multi-processor system cannot be formed.

Parameter configuration of processors, the number of interconnection ports and the number of supportable processor IDs are closely related to a pricing system of processors. Generally, the less numbers of the interconnection ports and processor IDs are supported by a processor, the cheaper the price is. A processor supporting 2 processor IDs is cheaper than a processor supporting 4 processor IDs in a domain.

As described above, the multi-processor system formed in the processor direct connection manner has a limited scale. In order to implement a CC-NUMA multi-processor system having a larger scale, node controllers are required. The node controller functions to expand the system scale and maintain global cache coherence. First, each node controller is connected to 1 to 4 processors, no as to form a node and a first-level cache coherency domain, and the intra-domain cache coherence is collectively maintained by the processors and the node controller. The node controller also occupies at least one processor ID in the domain, and therefore, the sum of the numbers of the processors and the node controller in the domain cannot be greater than the number of processor IDs supportable by the processor in the domain. Then, the node controllers are directly interconnected or are connected by using a node router to form a large-scale CC-NUMA system. Second-level cache coherence between nodes is maintained by the node controllers, and when a processor in a certain node accesses a memory of a processor in another node across nodes and cache coherency domains, global cache coherence is maintained by the node controllers.

The CC-NUMA system uses the node controllers to expand the system scale and maintain the global cache coherence, which increases overheads of cross-domain processing and inter-domain communication, resulting in significant reduction of remote memory accessing, and the larger the system scale is, the more obvious the reduction is. If a CC-NUMA system formed by 64 processors is built, two solutions may be used, in solution 1, there are 4 processors in a coherency domain of each node, and therefore, at least 16 node controllers are required for the whole system. In solution 2, a processor only supporting 2 processor IDs in the domain may be used, and therefore, in one node, the cache coherency domain can only be formed by one processor and one node controller, so that at least 64 node controllers are required. So many node controllers result in a very huge interconnection scale of nodes and much more complicated inter-node topology; therefore, the speed of cross-node accessing a remote memory is obviously deteriorated, thereby causing a rapid reduction of system efficiency and a tremendous loss of performance.

It can be seen that, for a multi-node multi-processor system, reducing the number of nodes plays a direct and significant role in reducing interconnection scale of nodes and simplifying inter-node topology, especially for a processor that can support very limited numbers of interconnection ports and processor IDs in a domain. Therefore, whether the number of node controllers can be reduced effectively is a very significant and urgent technical problem to be solved.

SUMMARY

Embodiments of method for building a multi-processor system with nodes having multiple cache coherency domains are provided.

Some embodiments are implemented as follows, in a multi-processor node system, a unified logical cache coherency domain is built in a controller of each node, and several processors and the node controller form multiple physical cache coherency domains isolated from one another; one embodiment disclosed herein includes a cache coherency domain building manner, a cache coherency domain dividing manner, and a directory structure manner; where (1) the building manner of multiple physical cache coherency domains includes:

1) connecting first-level nodes directly through node controllers or through a node router, so as to form a single cache coherency do lain of the first-level nodes;

2) directly connecting a second-level node controller to the first-level node controllers, and building a unified logical cache coherency domain in the second-level node controller, where the cache coherency domain completely includes multiple physical cache coherency domains that are isolated from one another and formed by the several first-level node controllers and the second-level node controller;

3) connecting second-level nodes directly through second-level node controllers or through a node router, so as to form a single cache coherency domain of the second-level nodes; and 4) extending to $n^{th}$ (n>2)-level nodes based on the manners of 1)-3), so as to implement a multi-processor system with more levels of nodes;

(2) the cache coherency domain dividing manner includes:

1) for the first-level node controller, using information of various ports connected to the processors as a domain attribute information source of the physical cache coherency domains formed by the several processors and the node controller, identifying, by each port domain information register, a physical sub-domain of the port, and configuring domain attribute information of each port by the port domain information register according to system requirements, thereby implementing division of various physical cache coherency domains formed by the several processors and the node controller;

2) for the second-level node controller, using information of various ports connected to the first-level node controllers as a domain attribute information source of the physical cache coherency domains formed by the several first-level node controllers and the second-level node controller, and configuring domain attribute information of each port according to the system requirements, thereby implementing division of various physical cache coherency domains formed by the several first-level node controllers and the second-level node controller; and 3) configuring port domain attributes of an $n^{th}$ (n>2)-level node controller by using the configuration manner of port domain attributes of the second-level node controller described in manner 2); and (3) the directory structure manner includes:

1) the first-level node controller using a local and remote double directory structure, where for a remote data directory, directory entries record processors possessing a unified data copy in the local node, as well as domain attribute information and coherence state information of the processors; and for a local data directory, directory entries record remote nodes possessing the data copy and coherence state information of the remote nodes, and a flag bit is set to indicate whether other sub-domains in the local node other than a physical sub-domain where the data is located possess the data copy;

2) the second-level node controller using a local and remote double directory structure, where for a remote data directory, directory entries record first-level nodes possessing a unified data copy in the local second-level node, as well as domain attribute information and coherence state information of the first-level nodes; and for a local data directory, directory entries record remote second-level nodes possessing the unified data copy and coherence state information of the remote second-level nodes, and a flag bit is set to indicate whether other sub-domains in the local second-level node other than a physical sub-domain where the data is located possess the data copy;

3) configuring a directory structure of an $n^{th}$ (n>2)-level node controller by using the directory structure manner of the second-level node controller described in manner 2);

4) the first-level node controller using a local/remote unified directory structure, where directory entries record all processors in the system other than the processors of this physical sub-domain possess unified data copy information and coherence state information;

5) the second-level node controller using a local/remote unified directory structure, where directory entries record all first-level node controllers in the system other than the first-level node controllers of this physical sub-domain possess unified data copy information and coherence state information;

6) configuring a directory structure of an $n^{th}$ (n>2)-level node controller by using the directory structure manner of the second-level node controller described in manner 5).

The embodiments of the disclosure herein has the following beneficial effects: the embodiments of the disclosure herein aims to solve the problem of limited node scale brought about by limited number of processor IDs supportable by a processor in a domain, the problem results in the over-large number of node controllers required by a multi-processor system, thereby causing large interconnection scale of nodes and complicated topology structure. By applying the embodiments of the disclosure herein, the number of node controllers required by a medium or large scale memory shared multi-processor system may be reduced significantly, thereby effectively improving the system performance and reducing the system topological complexity.

DETAILED DESCRIPTION

The method of the disclosure herein is described in detail below with reference to the accompanying drawings.

Embodiments

In a multi-processor system with multiple nodes, for each node, a unified logical cache coherency domain is built in a node controller of the node, so as to completely include multiple physical cache coherency domains that are isolated from one another and formed by several processors and the node controller; and the nodes may be directly connected through node controllers or connected through a node router (NR), so as to form a single cache coherency domain of the nodes.

In addition, a first-level node controllers of the above system may be connected to a second-level node controller, and a unified logical cache coherency domain is built in the second-level node controller, so as to completely include multiple physical cache coherency domains that are isolated from one another and formed by several first-level node controllers and the second-level node controller; the second-level nodes are directly connected through second-level node controllers or connected through a node router (NR), so as to form a single cache coherency domain of the second-level nodes.

Further, the above solution can also extend to an n (n>2)-level node system, so as to implement a multi-processor system with more levels of nodes.

For the node controller of the above system, information of various ports connected to the processors may be used as a domain attribute information source of the physical cache coherency domains formed by the several processors and the node controller, a domain information register of each port identifies a physical sub-domain of the port, and the port domain information register may configure domain attribute information of each port according to system requirements, thereby changing division of various physical cache coherency domains formed by the several processors and the node controller.

For the second-level node controller, information of various ports connected to the first-level node controllers may be used as a domain attribute information source of the physical cache coherency domains formed by the several first-level node controllers and the second-level node controller, and domain attribute information of various ports may be configured according to the system requirements, thereby changing division of various physical cache coherency domains formed by the several first-level node controllers and the second-level node controller.

Similarly, port domain attributes of an $n^{th}$ (n>2)-level node controller may be configured by using the port domain attribute configuration manner of the second-level node controller of the system.

For a directory construction of the node controller, a local and remote double directory structure may be used, where for a remote data directory, directory entries record processors possessing a data copy in a local node, as well as domain attribute information and coherence state information of the processors; and for a local data directory, directory entries record remote nodes possessing the data copy and coherence state information of the remote nodes, and a flag bit is set to indicate whether other sub-domains in the local node other than a physical sub-domain where the data is located possess the data copy.

For a directory construction of the node controller, a local/remote unified directory structure may also be used, where directory entries record data copy information and coherence state information possessed by all other processors in the system other than the processors of this physical sub-domain.

Similarly, the second-level node controller may use a local and remote double directory structure. For a remote data directory, directory entries record first-level nodes possessing a data copy in the local second-level node, as well as domain attribute information and coherence state information of the first-level nodes; and for a local data directory, directory entries record remote second-level nodes possessing the data copy and coherence state information of the remote second-level nodes, and a flag bit is set to indicate whether other sub-domains in the local second-level node other than a physical sub-domain where the data is located possess the data copy.

The second-level node controller may also use a local/remote unified directory structure, where directory entries record data copy information and coherence state information possessed by all other first-level node controllers in the system other than the first-level node controllers of this physical sub-domain.

Likewise, a directory structure of an $n^{th}$ (n>2)-level node controller may be configured by using the manner of the directory structure of the second-level node controller of the system.

Figure 1:
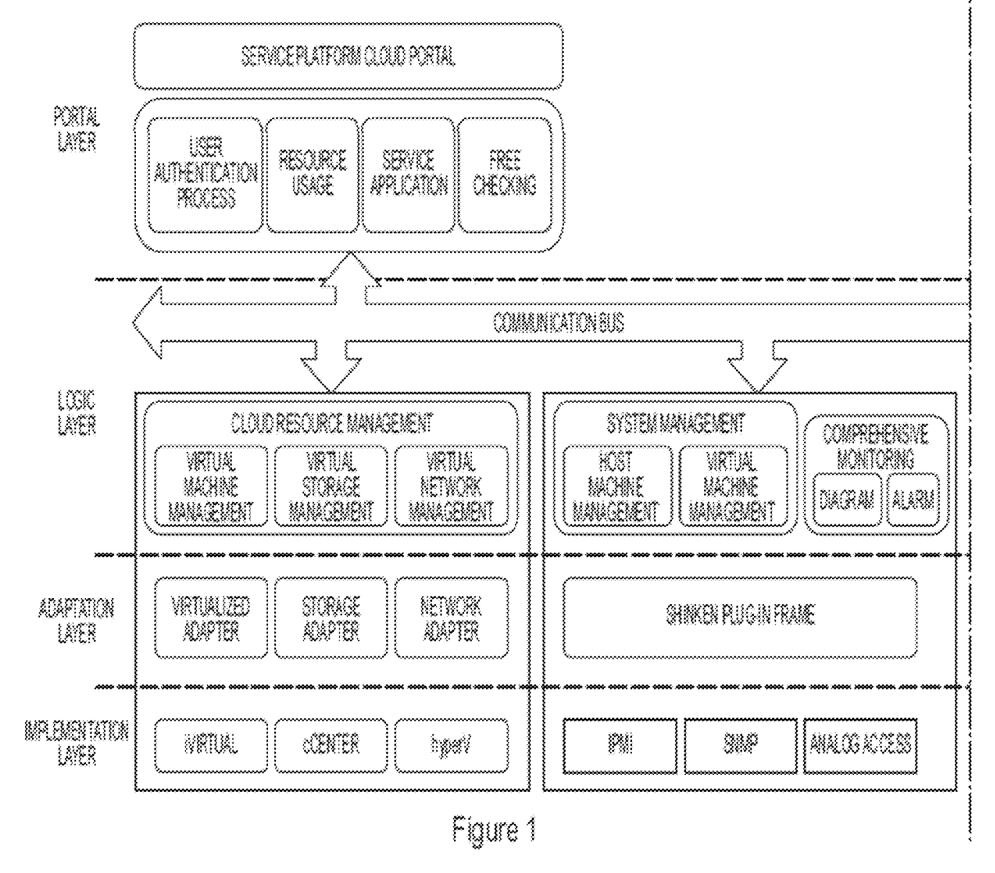
FIG. 1 is a schematic diagram of an existing multi-node multi-processor system architecture.

As shown in FIG. 1, each node is formed by several processors and a node controller. Various processors and the node controller in a local node are located in the same physical cache coherency domain, and an intra-node cross-processor accessing and storing operation may be performed directly.

Figure 2:
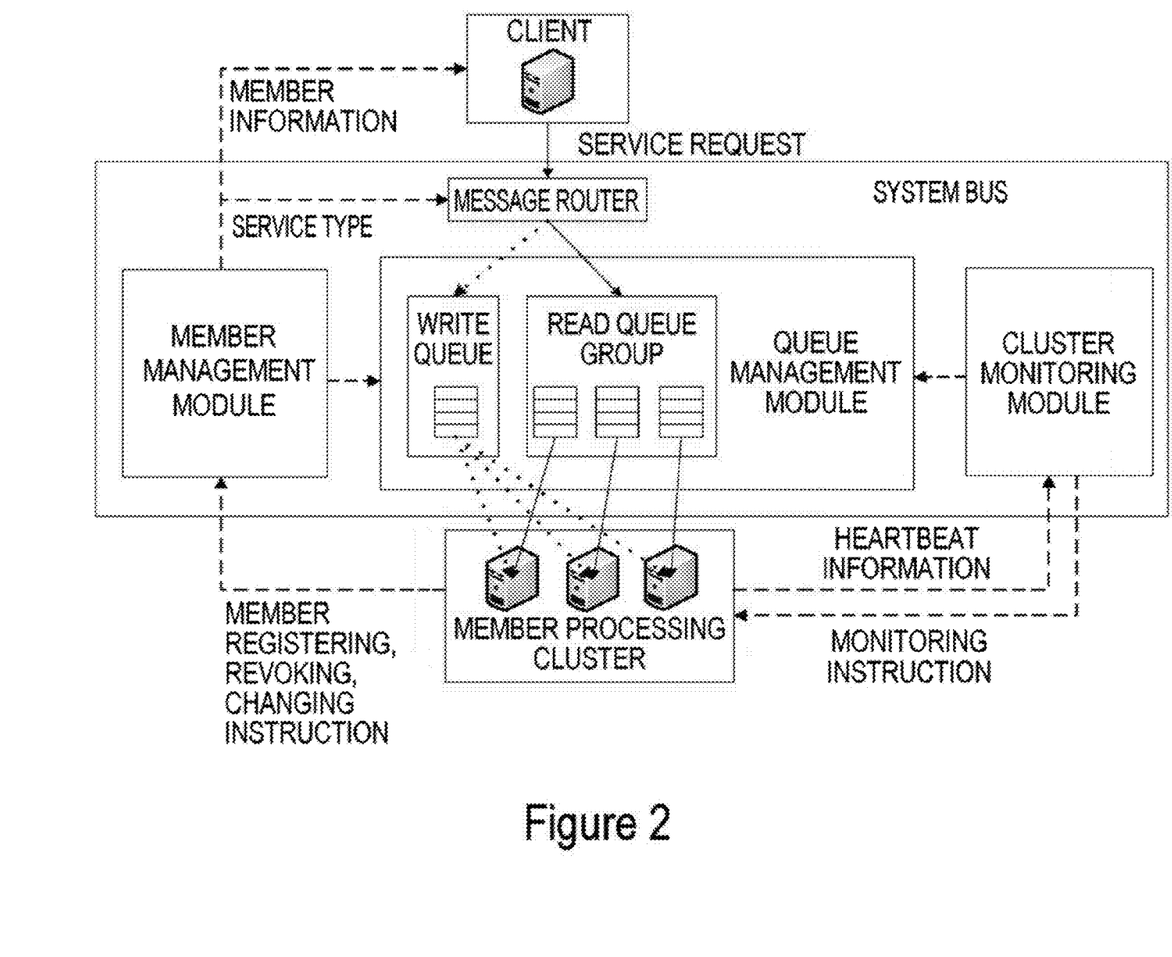
FIG. 2 is a schematic diagram of a multi-node multi-processor system architecture according to one embodiment of the disclosure.

As shown in FIG. 2, a node controller may be connected to the processors to form multiple intra-node physical cache coherency domains (for example, the node controller in FIG. 2 supports 2 intra-node physical cache coherency domains), and as compared with the system shown in FIG. 1, the number of node controllers used for forming a CC-NUMA system of the same processor scale by using the manner in FIG. 2 is reduced to one half. In the drawing, various node controllers are located at the same layer. Multiple layers of node controllers may be cascaded to build a large-scale system.

Figure 3:
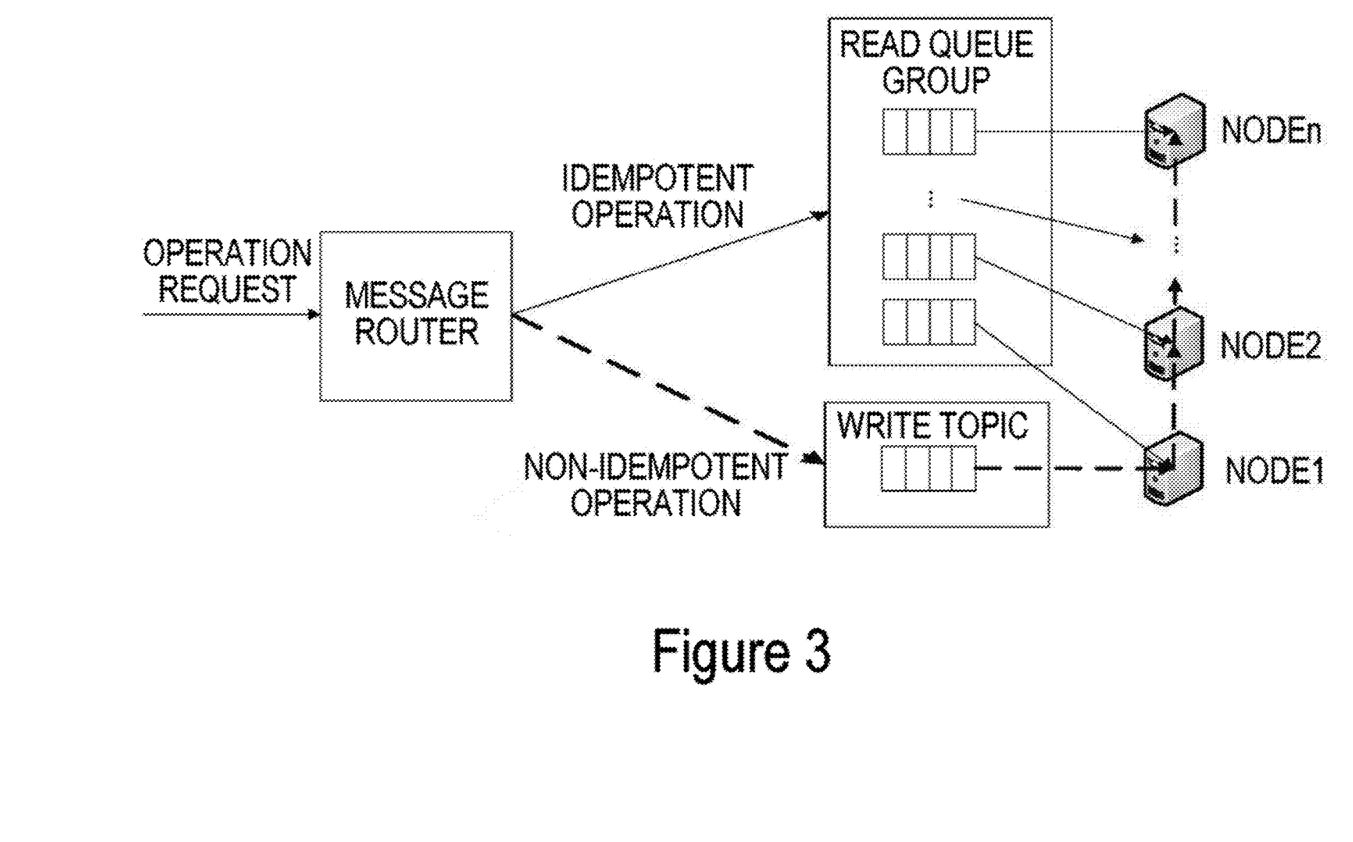
FIG. 3 is an exemplary diagram of a processor accessing a memory located in a different physical sub-domain in a local node.

As shown in FIG. 3, a processor P1 (301) belongs to a physical sub-domain Dom1 (307) of the node, and the P1 processor (301) accesses data of a memory module MEM2 (305) of a processor P2 (302) in a local node physical sub-domain Dom2 (308). A typical processing procedure is described as follows:

The processor P1 (301) does not hit a cache in the processor when performing the accessing and storing operation, and directs the access to a node controller (315) in the same physical cache coherency domain; therefore, the processor P1 (301) sends an access and storage request to a home proxy HP (309) of a remote memory proxy engine RPE (313) of the node controller (315); and The home proxy HP (309) of the remote memory proxy engine RPE (313) of the node controller (315) receives the access and storage request sent by the processor P1 (301), saves, in the home proxy HP (309), information of the access and storage request, including in which physical sub-domain the requesting processor is located, a request type, an access and storage address, and the like, and maintains a state of a read/write request in the processing procedure.

The home proxy HP (309) of the remote memory proxy engine RPE (313) inquires a remote memory directory RDIR (316), and determines whether it is required to perform a Snoop operation in various physical sub-domains in the local node other than the physical sub-domain in which a destination address is located. In this example, it is assumed that the physical sub-domain Dom1 (307) does not need to be processed. The home proxy HP (309) of the remote memory proxy engine RPE (313) forwards the access and storage request to a cache proxy CP (310) of the remote memory proxy engine RPE (313).

The cache proxy CP (310) of the remote memory proxy engine RPE (313) of the node controller (315) receives the access and storage request, and knows, according to the address of the access and storage request, that it belongs to a memory module in another physical sub-domain Dom2 (308) in this node, and therefore, forwards the access and storage request to a home proxy HIP (312) of a local memory proxy engine LPE (314).

The home proxy HP (312) of the local memory proxy engine LPE (314) of the node controller (315) receives the access and storage request, inquires a local memory directory LDIR (317), and determines whether other nodes possess a data copy having the same address; if yes, it is required to perform processing in an inter-node coherency domain. In this example, it is assumed that no other node possesses a data copy having the same address. The home proxy HP (312) of the local memory proxy engine LPE (314) forwards the request message to a cache proxy CP (311) of the local memory proxy engine LPE (314).

The cache proxy CP (311) of the local memory proxy engine LPE (314) of the node controller (315) receives the access and storage request forwarded by the home proxy HP (312) of the local memory proxy engine LPE (314), saves, in the cache proxy CP (311), information of the access and storage request, including a request type, an access and storage address and the like, and maintains a state of a read/write request in the processing procedure.

The cache proxy CP (311) of the local memory proxy engine LPE (314) determines, according to the access and storage address, that it belongs to data of the memory module MEM2 (305) of the processor P2 (302), so as to send the request to the processor P2 (302).

The processor P2 (302) receives and processes the access and storage request, and then the processor P2 (302) returns data and a coherence state thereof to the local memory proxy engine LPE (314) of the node controller (315).

The cache proxy CP (311) of the local memory proxy engine LPE (314) of the node controller (315) receives the returned data and coherence state thereof, and forwards the returned data and coherence state thereof to the home proxy HP (312) of the local memory proxy engine LPE (314).

The home proxy HP (312) of the local memory proxy engine (314) receives the returned data and coherence state thereof, and records, in the local data directory LDIR (317), that the cache proxy CP (310) of the remote proxy engine (313) possesses a data copy and coherence state thereof. The home proxy HP (312) of the local memory proxy engine (314) returns the data and coherence state thereof to the cache proxy CP (310) of the remote memory proxy engine RPE (313) of the local node (315).

The cache proxy CP (310) of the remote memory proxy engine RPE (313) of the node controller (315) receives the returned data and coherence state thereof, and forwards the returned data and coherence state thereof to the home proxy HP (309) of the remote memory proxy engine RPE (313).

The home proxy HP (309) of the remote memory proxy engine RPE (313) of the node controller (315) receives the returned data and coherence state thereof, and for the request address, records, in the remote memory directory RDIR (316), that the processor P1 (301) of the physical sub-domain Dom1 (307) possesses a copy and state of data having the address.

The home proxy HP (309) of the remote memory proxy engine RPE (313) of the node controller (315) returns the data and coherence state thereof to the processor P1 (301) of the requester Dom1 (307), thereby completing processing of the request.

Figure 4:
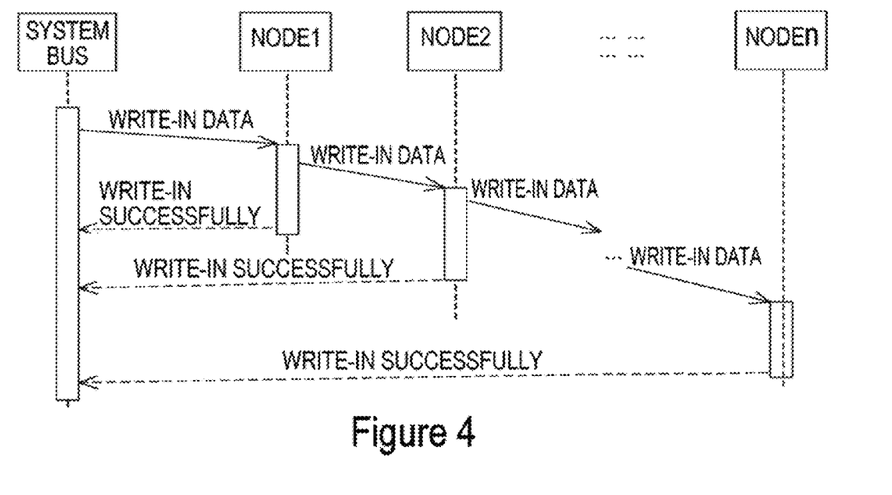
FIG. 4 is an exemplary diagram of a local node processor accessing a remote node memory.

As shown in FIG. 4, a processor P1 (401) belongs to a physical sub-domain Dom1 (413) of a node Node1 (433), and the P1 processor (401) accesses data of a memory module MEM2 (411) of a processor P2 (405) in a physical sub-domain Dom2 (416) of a remote node Node2 (434). The processing procedure is described as follows:

The processor P1 (401) of the node Node1 (433) does not hit a cache in the processor when performing the accessing operation, and according to an access and storage address, the processor P1 (401) may know that it does not belong to the local node Node1 (433), but belongs to the remote node Node2 (434). Therefore, the processor P1 (401) sends an access and storage request to a home proxy HP (417) of a remote memory proxy engine RPE (427) of a node controller (435); and The home proxy HP (417) of the remote memory proxy engine RPE (427) of the node controller (435) receives the access and storage request sent by the processor P1 (401), saves, in the home proxy HP (417), information of the access and storage request, including in which physical sub-domain (Dom1 or Dom2) of the local node Node1 the requesting processor is located, a request type, an access and storage address, and the like, and maintains a state of a cache read/write request in the processing procedure.

The home proxy HP (417) of the remote memory proxy engine RPE (427) of the node Node1 (433) inquires a remote memory directory RDIR (425), and determines whether it is required to perform a Snoop operation in various physical sub-domains in the local node. In this example, it is assumed that the physical sub-domain Dom1 (307) does not need to be processed. The home proxy HP (417) of the remote memory proxy engine RPE (427) may know, according to the address of the access and storage request, that it belongs to a memory module of the remote node Node2 (434), and thus forwards the access and storage request to a cache proxy CP (419) of the remote memory proxy engine RPE (427).

The cache proxy CP (419) of the remote memory proxy engine RPE (427) of the node Node1 (433) receives the access and storage request, saves, in the cache proxy CP (419), information of the access and storage request, including a request type, an access and storage address, and the like, and maintains a state of a read/write request in the processing procedure.

The cache proxy CP (419) of the remote memory proxy engine RPE (427) may know, according to the address of the access and storage request, that it belongs to the memory module managed by the node Node2 (434), and thus sends the request to the node Node2 (434);

An inter-node interconnection network sends the request message sent by the node Node1 (433) to the destination node Node2 (434);

A home proxy HP (424) of a local memory proxy engine LPE (432) of the node Node2 (434) receives the access and storage request, saves, in the home proxy HP (424), information of the request, including from which remote node the request is sent, a request type, an access and storage address, and the like, and maintains a state of a read/write request in the processing procedure.

The home proxy HP (424) of the local memory proxy engine EYE (432) inquires a local memory directory LDIR (430), and determines whether other nodes possess a data copy having the same address; if yes, it is required to perform processing in an inter-node coherency domain. In this example, it is assumed that there is no other node possessing a data copy having the same address, and it is not required to perform processing in the inter-node coherency domain.

The home proxy HP (424) of the local memory proxy engine LPE (432) forwards the request to a cache proxy CP (422) of the local memory proxy engine LPE (432);

The cache proxy CP (422) of the local memory proxy engine LPE (432) determines, according to the access and storage address, that it belongs to data of the memory module MEM2 (411) managed by the processor P2 (405) in the physical sub-domain Dom2 (416) of the node Node2 (434), so as to send the request to the processor P2 (405).

The processor P2 (405) of the node Node2 (434) receives and processes the access and storage request, and then the processor P2 (405) returns data and a coherence state thereof to the local memory proxy engine LPE (432) of the node controller (436).

The cache proxy CP (422) of the local memory proxy engine LPE (432) of the node controller (436) receives the returned data and coherence state thereof, and forwards the returned data and coherence state thereof to the home proxy HP (424) of the local memory proxy engine LPE (432).

The home proxy HP (424) of the local memory proxy engine LPE (432) of the node controller (436) receives the returned data and coherence state thereof and records, in the local memory directory LDIR (430), that the node 1 (433) possesses the data copy and coherence state thereof. The home proxy HP (424) of the local memory proxy engine LPE (432) of the node controller (436) returns the data and coherence state thereof to the remote memory proxy engine RPE (427) of the node 1 (433).

The cache proxy CP (419) of the remote memory proxy engine RPE (427) of the node controller (435) receives the returned data and coherence state thereof, and forwards the returned data and coherence state thereof to the home proxy HP (417) of the remote memory proxy engine RPE (427).

The home proxy HP (417) of the remote memory proxy engine RPE (427) of the node controller (435) records, in the remote data directory RDIR (425), that the processor P1 of the Dom1 possesses the data copy and possessing state thereof, and then returns the data and coherence state thereof to the processor P1 (401) of the requester Dom1, thereby completing processing of the request.

Figure 5:
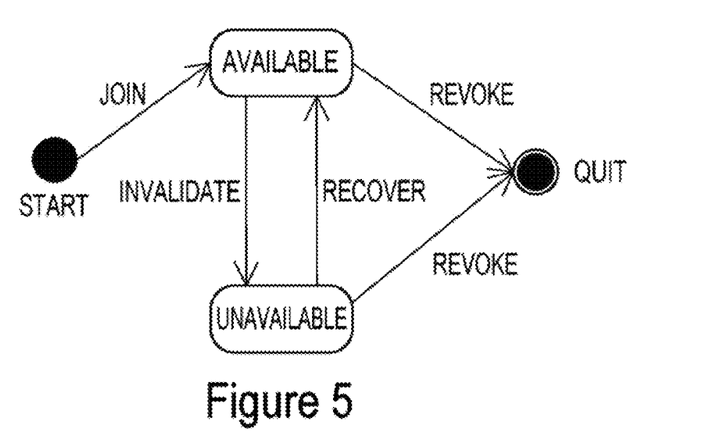
FIG. 5 is an exemplary diagram of a processor accessing a memory located in the same physically sub-domain in a local node.

As shown in FIG. 5, processing of a data snoop message is shown. In FIG. 5, a processor P2 (502) of a node 1 (533) belongs to a physical sub-domain Dom2 (514) of the node Node1 (533), and the P2 processor (502) accesses data of a memory module MEM3 (509) of a processor P3 (503) located in the same physical sub-domain Dom2 (514). A typical processing procedure is described as follows:

The processor P2 (502) of the node Node1 (533) does not hit a cache in the processor when performing the accessing operation, and according to an access and storage address, the processor P2 (502) may know that the address belongs to the memory module MEM3 (509) managed by the P3 processor (503) of the local node Node1 (533). The P3 processor (503) and the P2 (502) are located in the same physical sub-domain Dom2 (514), and therefore, the processor P2 (502) may directly access the memory module MEM3 (509). The processor P2 (502) directly sends an access and storage request to the processor P3 (503).

The processor 93 (503) receives the access and storage request, and finds that a node controller 1 (535), on behalf of other processors beyond this physical sub-domain, possesses a data copy; and according to a type of the received access and storage request, the processor P3 (503) sends data Snoop message to a cache proxy CP (518) of a local memory proxy engine LPE (528) of the node controller 1 (535);

The cache proxy CP (518) of the local memory proxy engine LPE (528) of the node controller 1 (535) receives the data snoop message, and forwards the message to a home proxy HP (520) of the local memory proxy engine LPE (528) of the node controller 1 (535).

The home proxy HP (520) of the local memory proxy engine LPE (528) of the node controller 1 (535) receives the data snoop message, and inquires a local data directory LDIR (526). In this example, it is assumed that the local data directory LDIR (526) displays that a processor in another physical sub-domain of the node 1 (533) (in this example, a processor in a physical sub-domain Dom1) and a processor in a remote node 2 (534) possess the data copy. Therefore, the home proxy HP (520) of the local proxy engine LPE (528) forwards the data snoop message to a cache proxy CP (519) of a remote proxy engine RPE (527) of the ode controller (535), so as to process the data copy in a Dom1 (513) in the local node Node1 (533). In addition, the home proxy HP (520) of the local proxy engine LPE (528) sends the data snoop message to a cache proxy CP (523) of a remote proxy engine RPE (531) of the remote node Node2 (534), on as to process the data copy in the remote node Node2 (534).

The cache proxy CP (519) of the remote memory proxy engine RPE (527) of the node controller 1 (535) receives the sent data snoop message, and forwards the message to a home proxy HP (517) of the remote memory proxy engine RPE (527);

The home proxy HP (517) of the remote memory proxy engine RPE (527) of the node controller 1 (535) receives the message, and inquires a remote data directory RDIR (525), so as to determine whether a processor in the physical sub-domain Dom1 (513) of the local node (533) possesses the data copy. In this example, it is assumed that a processor P1 (501) in the physical sub-domain Dom1 (513) of the local node (533) possesses the data copy, and the home proxy HP (517) of the remote memory proxy engine RPE (527) of the node controller 1 (535) sends the data snoop message to the processor P1 (501) in the physical sub-domain Dom1 (513).

The processor P1 (501) receives the data snoop message, updates a data copy state according to a type of the message, and then returns a reply message to the home proxy HP (517) of the remote data engine RPE (527) in the node controller 1 (535).

The home proxy HP (517) of the remote memory proxy engine RPE (527) in the node controller 1 (535) collects all reply messages in the local node (in this example, only the processor P1 (501) in the physical sub-domain Dom1 (513) possesses the data copy), and forwards the reply of the data snoop message to the cache proxy CP (519) of the remote data engine RPE (527).

The cache proxy CP (519) of the remote memory proxy engine RPE (527) in the node controller 1 (535) sends the reply message to the home proxy HP (520) of the local memory proxy engine LPE (528) in the node controller 1 (535).

The home proxy HP (520) of the local memory proxy engine LPE (528) in the node controller 1 (535) receives the reply message sent by the cache proxy CP (519) of the remote memory proxy engine RPE (527), thereby completing the snooping of the local node Node1 (533).

During processing of the snooping of local node Node1 (533), the cache proxy CP (523) of the remote memory proxy engine RPE (531) of the node controller 2 (536) receives the data snoop message sent by the home proxy HP (520) of the local memory proxy engine LPE (528) of the node controller 1 (535), and forwards the message to a home proxy HP (521) of the remote memory proxy engine RPE (531) of the node controller 2 (536);

The home proxy HP (521) of the remote memory proxy engine RPE (531) of the node controller 2 (536) receives the data snoop message, and inquires a remote data directory RDIR (529), so as to determine whether processors in various physical sub-domains in the local node (534) possess the data copy. In this example, it is assumed that a processor P1 (504)

in a physical sub-domain Dom1 (515) of the node 2 (534) possesses the data copy, and the home proxy HP (521) of the remote memory proxy engine RPE (531) of the node controller 2 (536) sends the data snoop message to the processor P1 (504) in the physical sub-domain Dom1 (515).

The processor P1 (504) receives the data snoop message, updates a data copy state in the processor according to a type of the message, and then returns a reply message to the home proxy HP (521) of the remote data engine RPE (531) in the node controller 2 (536).

The home proxy HP (521) of the remote memory proxy engine RPE (531) in the node controller 2 (536) collects all reply messages in the local node, and forwards the reply message to the cache proxy CP (523) of the remote data engine RPE (531).

The cache proxy CP (523) of the remote memory proxy engine RPE (531) in the node controller 2 (536) sends the reply message to the home proxy HP (520) of the local memory proxy engine LPE (528) in the node controller 1 (535).

The home proxy HP (520) of the local memory proxy engine LPE (528) of the node controller 1 (535) receives the reply message sent by the cache proxy CP (523) of the remote memory proxy engine RPE (531) of the node controller 2 (536).

The home proxy HP (520) of the local memory proxy engine LPE (528) of the node controller 1 (535) collects all reply messages, then updates the local data directory LDIR (526), and forwards the reply message to the cache proxy CP (518) of the local memory proxy engine LPE (528).

The cache proxy CP (518) of the local memory proxy engine LPE (528) of the node controller 1 (535) sends the reply message to the processor P3 (503) in the physical sub-domain Dom2 (514).

The processor P3 (503) receives the reply, then updates internal directory information thereof, and sends data to the requester processor P2 (502).

Figure 6:
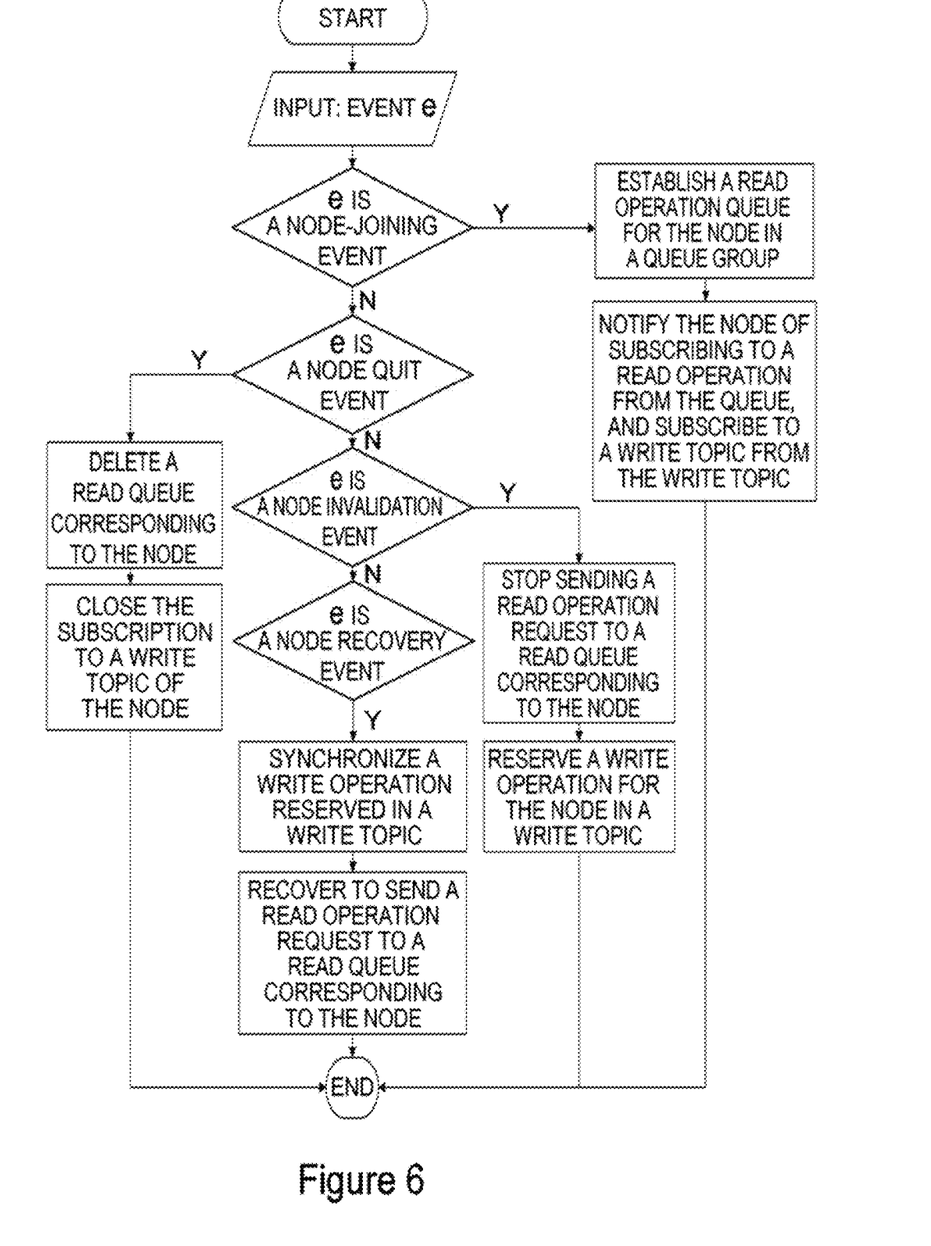
FIG. 6 is a design diagram of a directory format.

Directory format designs are shown in FIG. 6:

Information recorded by a remote memory directory RDIR in a remote memory proxy engine RPE is classified into two parts according to an access and storage address:

data sharer information of a remote address in various physical sub-domains of a local node: it is recorded whether various processors in various physical sub-domains of the local node possess a data copy and a coherence state thereof;

data sharer information of a local address in various physical sub-domains of the local node: it is assumed that the local node consists of n physical sub-domains including Dom1 to Dom n, and for memory data managed by a processor in a physical sub-domain Dom i (i=1, 2, . . . , n), the RDIR records whether a processor in a physical sub-domain Dom j (j=1, 2, . . . , n, and j!=i) in the local node possesses the data copy and coherence state thereof.

Information recorded by a local memory directory LDIR in a local memory proxy engine LPE (as shown in FIG. 6(*b*)) indicates whether memory data in a certain physical sub-domain in the local node is cached by remote nodes, or other physical sub-domains of the local node.

Local and remote directories may also be integrated into a unified directory structure (UDIR), as shown in FIG. 6 (*c*). Directory entries of the UDIR record all other processors in the system other than the processors of this physical sub-domain possess data copy information and coherence state information.

Figure 7:
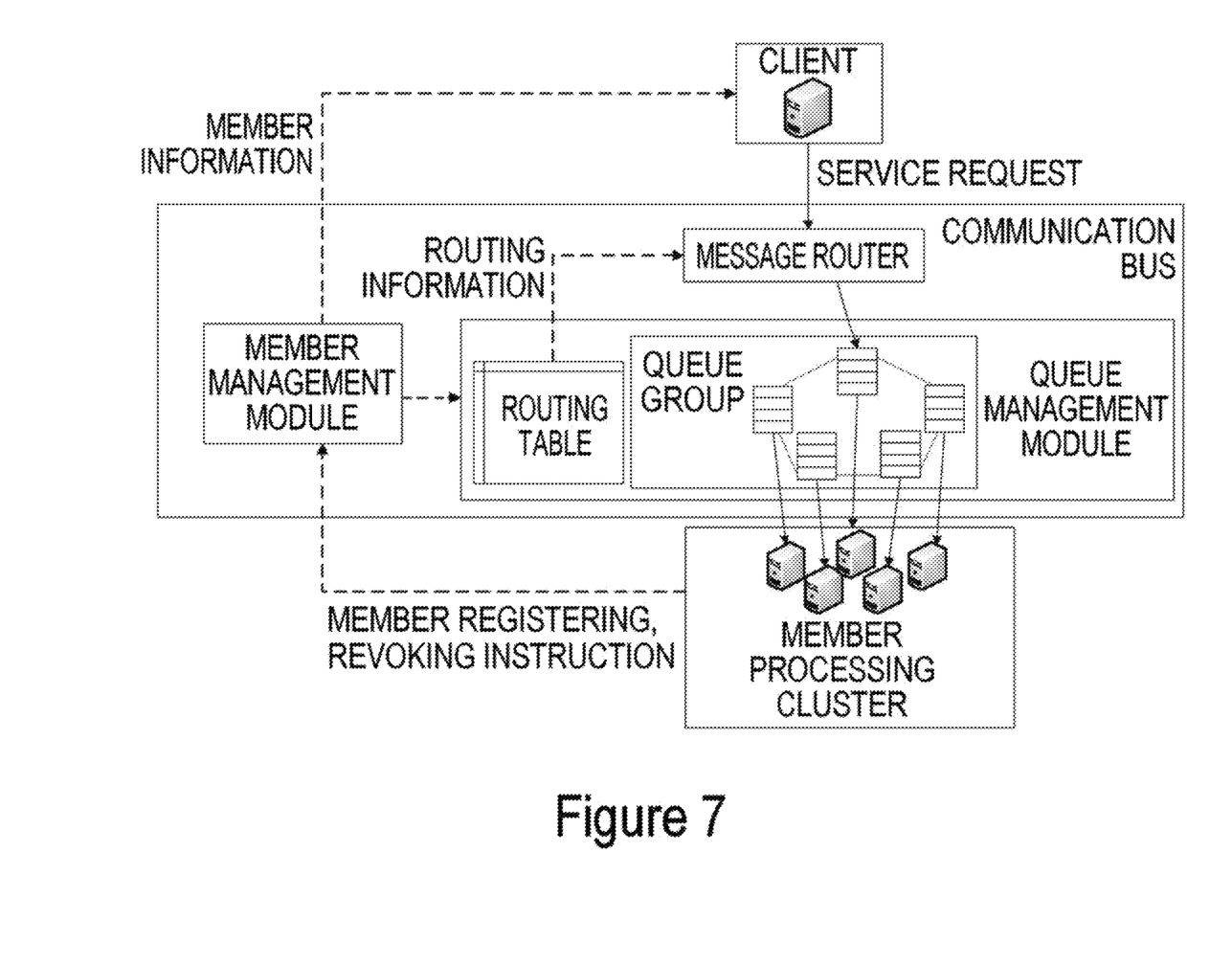
FIG. 7 is an exemplary diagram of setting physical sub-domain attributes of a port of a processor.
Figure 8:
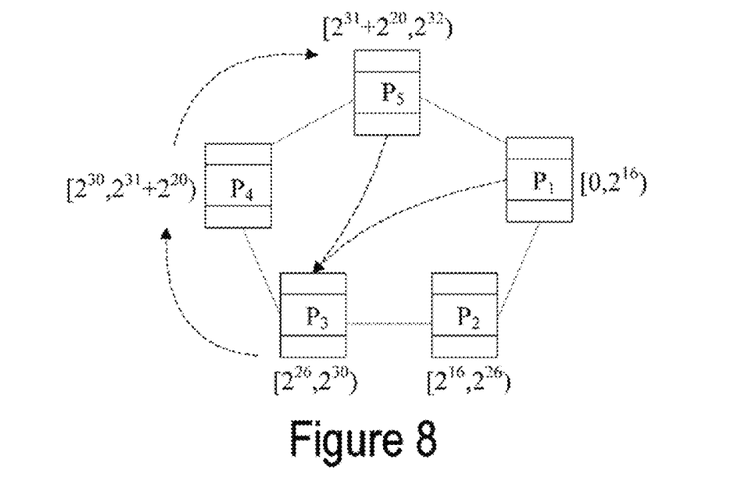
FIG. 8 is a process flow chart of a processor accessing a memory located in a different physical sub-domain in a local node.
Figure 9:
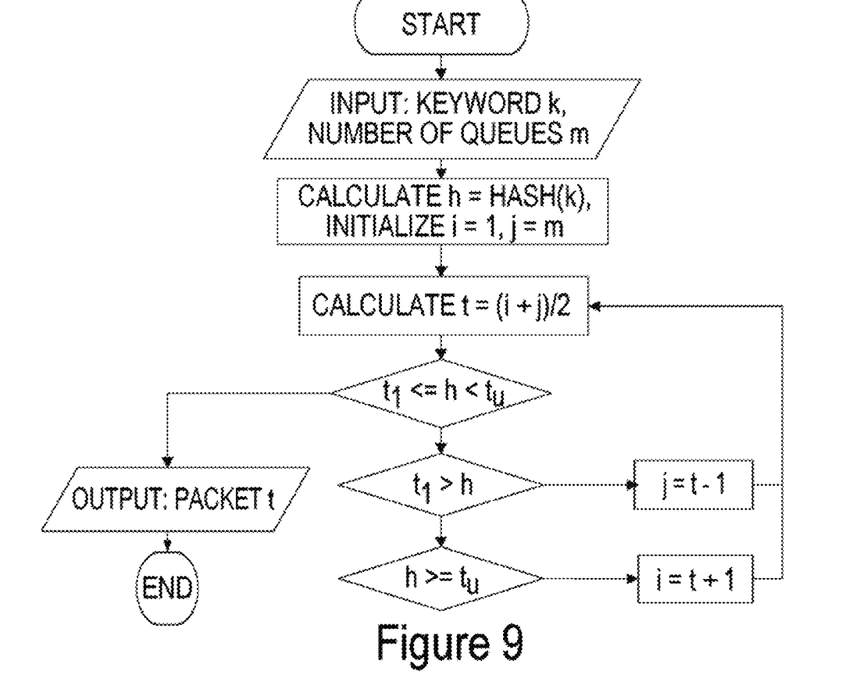
FIG. 9 is a process flow chart of a processor accessing a remote node memory.

As shown in FIG. 7, a node controller (712) may support multiple physical sub-domains. To which physical sub-domain each processor interface of the node controller (712) belongs may be configured. For each processor interface, a physical sub-domain identification register (709, 710, 711) is configured for the interface to indicate the physical sub-domain to which the processor interface belongs. The physical sub-domain identification register (709, 710, 711) of the processor interface of the node controller may be configured during booting of the system, and may also be configured during running of the system.

Except the technical features described in the specification, all used technologies are prior arts known by persons skilled in the art.

The invention claimed is:

1. A method for building a multi-processor system with nodes having multiple cache coherency domains, wherein in the multi-processor node system, a unified logical cache coherency domain is built in a controller of each node, and several processors and the node controller form multiple physical cache coherency domains isolated from one another; comprising a cache coherency domain building manner, a cache coherency domain dividing manner, and a directory structure manner, wherein (1) the building manner of the multiple physical cache coherency domains comprises:

1) connecting first-level nodes directly through node controllers or through a node router, so as to form a single cache coherency domain of the first-level nodes;

2) directly connecting a second-level node controller to the first-level node controllers, and building a unified logical cache coherency domain in the second-level node controller, wherein the cache coherency domain comprises multiple physical cache coherency domains that are isolated from one another and formed by the several first-level node controllers and the second-level node controller;

3) connecting second-level nodes directly through second-level node controllers or through a node router, an as to form a single cache coherency domain of the second-level nodes; and 4) extending to $n^{th}$ (n>2)-level nodes based on the manners of 1)-3), so as to implement a multi-processor system with more levels of nodes;

(2) the cache coherency domain dividing manner comprises:

1) for the first-level node controller, using information of various ports connected to the processors as a domain attribute information source of the physical cache coherency domains formed by the several processors and the node controller, identifying, by each port domain information register, a physical sub-domain of the port, and configuring domain attribute information of each port by the port domain information register according to system requirements, thereby implementing division of various physical cache coherency domains formed by the several processors and the node controller;

2) for the second-level node controller, using information of various ports connected to the first-level node controllers as a domain attribute information source of the physical cache coherency domains formed by the several first-level node controllers and the second-level node controller, and configuring domain attribute information of each port according to the system requirements, thereby implementing division of various physical cache coherency domains formed by the several first-level node controllers and the second-level node controller; and 3) configuring port domain attributes of an $n^{th}$ (n>2)-level node controller by using the configuration manner of port domain attributes of the second-level node controller described in item 2) of the dividing manner;

(3) the directory structure manner comprises:
1) the first-level node controller using a local and remote double directory structure, wherein for a remote data directory, directory entries record processors possessing a unified data copy in the local node, as well as domain attribute information and coherence state information of the processors; and for a local data directory, directory entries record remote nodes possessing the data copy and coherence state information of the remote nodes, and a flag bit is set to indicate whether other sub-domains in the local node other than a physical sub-domain where the data is located possess the data copy;
2) the second-level node controller using a local and remote double directory structure, wherein for a remote data directory, directory entries record first-level nodes possessing a unified data copy in the local second-level node, as well as domain attribute information and coherence state information of the first-level nodes; and for a local data directory, directory entries record remote second-level nodes possessing the unified data copy and coherence state information of the remote second-level nodes, and a flag bit is set to indicate whether other sub-domains in the local second-level node other than a physical sub-domain where the data is located possess the data copy;
3) configuring a directory structure of an $n^{th}$ (n>2)-level node controller by using the directory structure manner of the second-level node controller described in item 2) of the directory structure manner;
4) the first-level node controller using a local/remote unified directory structure, where directory entries record all processors in the system other than the processors of this physical sub-domain possess unified data copy information and coherence state information;
5) the second-level controller using a local/remote unified directory structure, where directory entries record all first-level node controllers in the system other than the first-level node controllers of this physical sub-domain possess unified data copy information and coherence state information; and
6) configuring a directory structure of an $n^{th}$ (n>2)-level node controller by using the directory structure manner of the second-level node controller described in item 5) of the directory structure manner.

* * * * *